US012347353B2

(12) United States Patent
Min et al.

(10) Patent No.: US 12,347,353 B2
(45) Date of Patent: Jul. 1, 2025

(54) DATA DRIVING CIRCUIT AND DISPLAY APPARATUS COMPRISING THE SAME

(71) Applicant: LG Display Co., Ltd., Seoul (KR)

(72) Inventors: ByungSam Min, Paju-si (KR); InYeong Kong, Paju-si (KR); Wondoo Kim, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/513,713

(22) Filed: Nov. 20, 2023

(65) Prior Publication Data

US 2024/0265838 A1 Aug. 8, 2024

(30) Foreign Application Priority Data

Feb. 2, 2023 (KR) ........................ 10-2023-0014285

(51) Int. Cl.
*G09G 3/00* (2006.01)
*G09G 3/3233* (2016.01)
*G09G 3/3291* (2016.01)

(52) U.S. Cl.
CPC ........... *G09G 3/006* (2013.01); *G09G 3/3233* (2013.01); *G09G 3/3291* (2013.01); *G09G 2300/0819* (2013.01); *G09G 2300/0842* (2013.01); *G09G 2310/027* (2013.01); *G09G 2320/0626* (2013.01); *G09G 2330/08* (2013.01); *G09G 2330/12* (2013.01)

(58) Field of Classification Search
CPC .... G09G 3/006; G09G 3/3233; G09G 3/3291; G09G 2300/0819; G09G 2300/0842; G09G 2310/027; G09G 2320/0626; G09G 2330/08; G09G 2330/12
See application file for complete search history.

(56) References Cited

U.S. PATENT DOCUMENTS

2005/0270059 A1* 12/2005 Ando .................... G09G 3/006 324/760.01
2008/0180588 A1* 7/2008 Ando .................. G09G 3/3648 349/37
2016/0155380 A1 6/2016 Kwon et al.
(Continued)

FOREIGN PATENT DOCUMENTS

| | | | |
|---|---|---|---|
| KR | 10-2021-0055375 | A | 5/2021 |
| TW | 201833896 | A | 9/2018 |
| TW | 201926299 | A | 7/2019 |

OTHER PUBLICATIONS

Taiwanese Office Action dated Sep. 5, 2024 issued in Patent Application No. 11320917150 (8 pages).

*Primary Examiner* — Md Saiful A Siddiqui
(74) *Attorney, Agent, or Firm* — Fish & Richardson P.C.

(57) ABSTRACT

Disclosed is a data driving circuit comprising a digital-to-analog converter configured to supply a data voltage to a plurality of data lines connected to respective pixels and to respectively supply sensing driving data voltages having different voltage levels to the first data line and the second data line adjacent to each other among the plurality of data lines, and a line defect detecting portion connected to the first data line and the second data line and configured to sense a sensing data voltage of each of the first data line and the second data line and to detect whether a short circuit occurs between the first data line and the second data line based on the sensed sensing data voltage.

15 Claims, 5 Drawing Sheets

(56) References Cited

U.S. PATENT DOCUMENTS

| | | | | |
|---|---|---|---|---|
| 2019/0213936 | A1* | 7/2019 | Cho | G09G 3/20 |
| 2020/0027379 | A1* | 1/2020 | Kim | G01R 1/30 |
| 2021/0407349 | A1* | 12/2021 | Choi | G09G 3/3614 |
| 2022/0319403 | A1* | 10/2022 | Shiibayashi | G09G 3/32 |
| 2023/0196974 | A1* | 6/2023 | Im | G09G 3/3233<br>345/212 |
| 2023/0215309 | A1* | 7/2023 | Piao | G09G 3/006<br>345/204 |

* cited by examiner

DATA DRIVING CIRCUIT AND DISPLAY APPARATUS COMPRISING THE SAME

CROSS-REFERENCE TO RELATED APPLICATIONS

This application claims the benefit of the Korean Patent Application No. 10-2023-0014285 filed on Feb. 2, 2023, which is hereby incorporated by reference as if fully set forth herein.

BACKGROUND

Technical Field

The present disclosure relates to a data driving circuit and a display apparatus comprising the same.

Description of the Related Art

With the development of information society, the demand for a display apparatus for displaying an image is increasing in various forms. Accordingly, a display apparatus such as a Liquid Crystal Display (LCD) device, an Organic Light Emitting Diode (OLED) display, a Micro Light Emitting Diode (LED) display apparatus, a Quantum Dot Display (QD) display apparatus, and the like is used.

In the display apparatus, subpixels including light emitting elements may be arranged in a matrix form and a brightness of the subpixels that are selected by a scan signal may be controlled according to a grayscale of the data.

Defects of signal lines, such as a short circuit between the signal lines or a short circuit between the signal and voltage lines, may occur due to various causes, for example, foreign matter during a manufacturing process of a display panel in the display apparatus, external temperature or impact, damage caused by repair of display panel, and the like.

When the defect of signal line occurs, an abnormal current (or voltage) or an overcurrent (or overvoltage) may be applied to the display apparatus. In this case, it is difficult to normally drive the display panel of the display apparatus. Furthermore, defects may cause a screen abnormality such as a bright line on the screen.

SUMMARY

The present disclosure has been made in view of the above problems, and it is an object of the present disclosure to provide a data driving circuit capable of detecting a defective signal line of a display panel and performing a repairing process by darkening a bright line defect in the defective signal line.

Additional advantages, aspects, and features of the disclosure are set forth in part in the present disclosure and will also be apparent from the present disclosure or may be learned by practice of the inventive concepts provided herein. Other features, advantages, and aspects of the present disclosure may be realized and attained by the structure particularly pointed out in the present disclosure, or derivable therefrom, and claims hereof as well as the appended drawings.

In accordance with an aspect of the present disclosure, the above and other objects may be accomplished by the provision of a data driving circuit comprising a digital-to-analog converter configured to supply a data voltage to a plurality of data lines connected to respective pixels, and supply sensing driving data voltages having different voltage levels to a first data line and a second data line adjacent to each other among the plurality of data lines, and a line defect detector connected to the first data line and the second data line and configured to sense a sensing data voltage of each of the first data line and the second data line, and detect the presence of a short circuit between the first data line and the second data line based on the sensing data voltage.

In accordance with another aspect of the present disclosure, there is provided a display apparatus comprising a display panel on which a plurality of pixels connected to a plurality of data lines are disposed, and a data driver including a digital-to-analog converter and a line defect detector and configured to drive the plurality of data lines based on detected defects associated with the lines, the digital-to-analog converter and the line defect detector may be configured to supply a data voltage to a plurality of data lines connected to respective pixels, and supply sensing driving data voltages having different voltage levels to a first data line and a second data line adjacent to each other among the plurality of data lines, sense a sensing data voltage of each of the first data line and the second data line, and detect the presence of a short circuit between the first data line and the second data line based on the sensing data voltage.

According to the aspect of the present disclosure, there is the data driving circuit which efficiently detects the defect generated in the signal line of the display panel and performs the repairing process by darkening the bright line defect caused by the signal line having the defect, and there is the display apparatus having the same.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosures as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
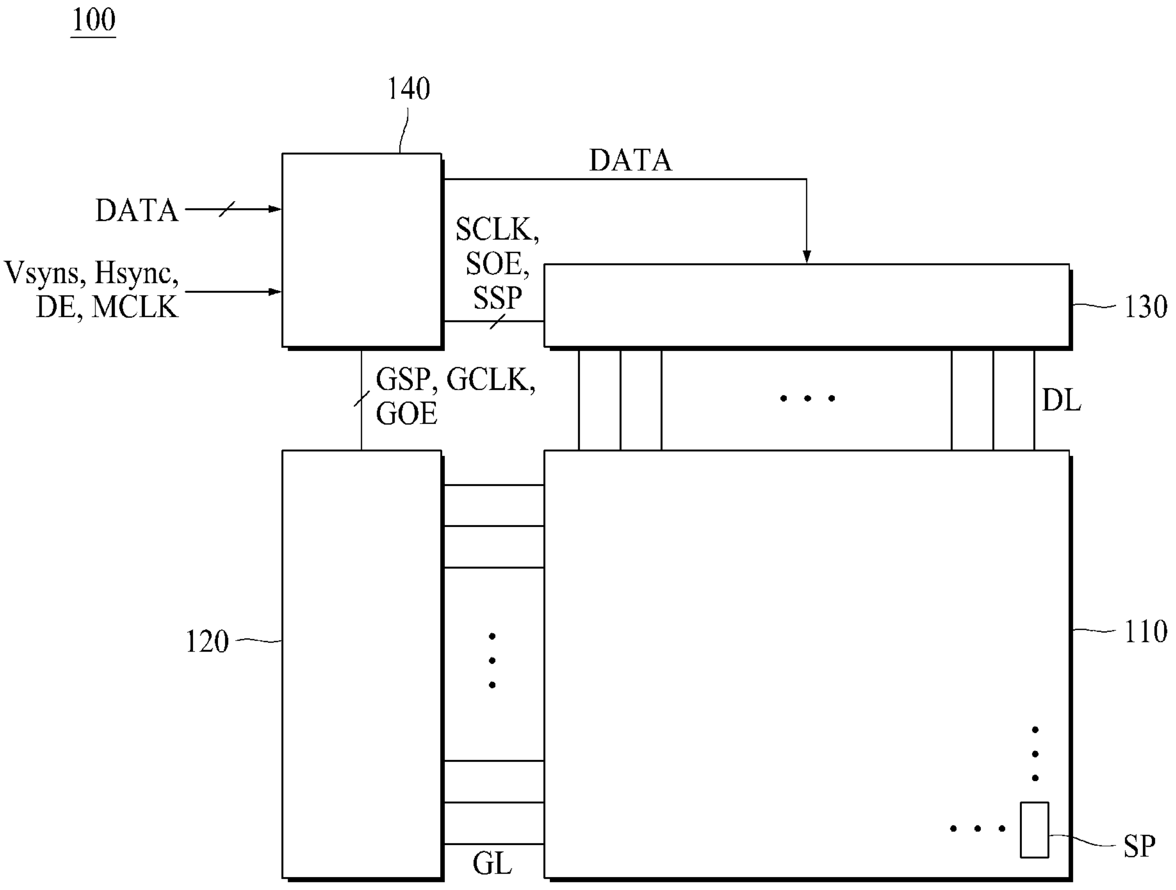
FIG. 1 is a diagram illustrating a display apparatus according to the aspect of the present disclosure.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure may operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other or may be carried out together in co-dependent relationship.

Hereinafter, a preferred aspect of a light emitting display device according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a block diagram schematically illustrating a display apparatus according to the aspect of the present disclosure.

Referring to FIG. 1, a display apparatus 100 according to the aspect of the present disclosure may comprise a display panel 110 provided with a plurality of gate lines GL and a plurality of data lines DL connected thereto, and provided with a plurality of subpixels arranged in a matrix form, a gate driver 120 for driving the plurality of gate lines GL, a data driver 130 for supplying a data voltage through the plurality of data lines DL, and a timing controller 140 for controlling the gate driver 120 and the data driver 130.

The display panel 110 may display an image based on a scan signal transmitted from the gate driver 120 through the plurality of gate lines GL and a data voltage transmitted from the data driver 130 through the plurality of data lines DL.

In case of the LCD apparatus, the display panel 110 includes a liquid crystal layer formed between two substrates. The display panel 110 may be operated in any known mode such as a Twisted Nematic (TN) mode, a Vertical Alignment (VA) mode, an In Plane Switching (IPS) mode, a Fringe Field Switching (FFS) mode, and the like. In case of the organic light emitting display apparatus, the display panel 110 may be implemented in a top emission type, a bottom emission type, a dual emission type, or the like.

The display panel 110 may include a plurality of pixels arranged in a matrix form, wherein each pixel includes subpixels SP of different colors, for example, a white subpixel, a red subpixel, a green subpixel, and a blue subpixel, and each subpixel SP may be defined by the plurality of data lines DL and the plurality of gate lines GL.

In some aspects, one subpixel SP may include a thin film transistor TFT formed in an intersection area of one data line DL and one gate line GL, a light emitting element such as an organic light emitting diode for charging the data voltage, a storage capacitor electrically connected to the light emitting element to maintain a voltage, and the like.

For example, when the display apparatus 100 with resolution of 2,160×3,840 is composed of four subpixels SP of white W, red R, green G, and blue B, 15,360 data lines DL (3,840×4=15,360) may be provided by 2,160 gate lines GL and 3,840 data lines DL that are respectively connected to the four subpixels WRGB, and each subpixel SP may be disposed in the intersection area of the gate line GL and the data line DL.

The gate driver 120 is controlled by the timing controller 140. The gate driver 120 sequentially outputs scan signals to the plurality of gate lines GL disposed on the display panel 110, to thereby control driving timings of the plurality of subpixels SP.

In the display apparatus 100 with resolution of 2,160×3,840, a case where the scan signal is sequentially output from the first gate line to the 2160th gate line may be referred to as 2,160 phase driving. Alternatively, the scan signal is sequentially output from the first gate line to the fourth gate line, and then the scan signal is sequentially output from the fifth gate line to the eighth gate line. That is, a case where the scan signal is sequentially output in units of four gate lines GL may be referred to as 4 phase driving. In other words, a case where the scan signal is sequentially output for each of the N gate lines GL may be referred to as N-phase driving.

The gate driver 120 may include at least one gate driving integrated circuit GDIC. The gate driver 120 may be located on one side of the display panel 110 or on both sides of the display panel 110 according to a driving method. Alternatively, the gate driver 120 may be embedded in a bezel area of the display panel 110 to be implemented in the form of Gate In Panel (GIP).

The data driver 130 may receive digital image data DATA from the timing controller 140 and may convert the received digital image data DATA into an analog data voltage. The analog data voltage is output to each data line DL in accordance with the timing at which the scan signal is applied through the gate line GL so that each subpixel SP connected to the data line DL may display an emission signal of luminance corresponding to the data voltage.

The data driver 130 may include at least one source driving integrated circuit SDIC, and the source driving integrated circuit SDIC may be connected to a bonding pad of the display panel 110 or may be directly disposed on the display panel 110 by a tape automated bonding TAB method or a chip on glass (COG) method.

For example, each source driving integrated circuit SDIC may be integrated and arranged in the display panel 110. In addition, each source driving integrated circuit SDIC may be implemented in a Chip On Film (COF) method. In this case, each source driving integrated circuit SDIC may be mounted on a circuit film and may be electrically connected to the data line DL of the display panel 110 through the circuit film.

The timing controller 140 may supply various control signals to the gate driver 120 and the data driver 130 and may control the operation of the gate driver 120 and the data driver 130. For example, the timing controller 140 may control the gate driver 120 to output the scan signal according to timing implemented in each frame and may transmit the digital image data DATA received from the outside to the data driver 130.

The timing controller 140 may receive various timing signals including a vertical synchronization signal Vsync, a horizontal synchronization signal Hsync, a data enable signal DE, and a main clock signal MCLK from the outside (for example, host system) together with the digital image data DATA. Accordingly, the timing controller 140 may generate a control signal using the various timing signals received from the outside and may transmit the control signal to the gate driver 120 and the data driver 130.

For example, to control the gate driver 120, the timing controller 140 may output various gate control signals including a gate start pulse GSP, a gate clock GCLK, a gate output enable signal GOE, and the like. For example, the gate start pulse GSP may control the timing at which one or more gate driving integrated circuits GDIC constituting the gate driver 120 start to operate. Also, the gate clock GCLK is a clock signal commonly input to one or more gate driving integrated circuits GDIC and may control to shift timing of the scan signal. Further, the gate output enable signal GOE may specify timing information of one or more gate driving integrated circuits GDIC.

To control the data driver 130, the timing controller 140 may output various data control signals including a source start pulse SSP, a source sampling clock SCLK, a source output enable signal SOE, and the like. For example, the source start pulse SSP may control the timing at which one or more source driving integrated circuits SDICs constituting the data driver 130 start the data sampling. The source sampling clock signal SCLK may be a clock signal for controlling the timing of sampling the data in the source driving integrated circuit SDIC. The source output enable signal SOE may control the output timing of the data driver 130.

The display apparatus 100 according to the aspect of the present disclosure may include a power management integrated circuit for supplying various voltages or currents to the display panel 110, the gate driver 120, and the data driver 130 or controlling various voltages or currents to be supplied thereto.

The subpixel SP arranged in the display panel 110 of the display apparatus 100 according to the aspect of the present disclosure is located at the intersection point of the gate line GL and the data line DL, and each subpixel SP may be composed of a light emitting element and a circuit element such as a driving transistor for emitting light. For example, the display apparatus 100 may include the light emitting element such as an organic light emitting diode OLED in each of the subpixels SP, and may display an image by controlling a current flowing through the light emitting element on the basis of voltage difference between the data voltage and a reference voltage.

Figure 2:
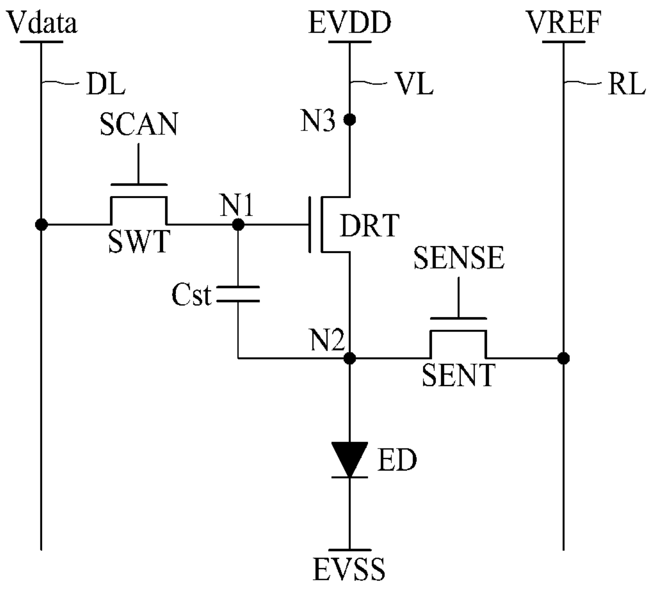
FIG. 2 is a circuit diagram illustrating a configuration of a subpixel in the display apparatus according to the aspect of the present disclosure.

FIG. 2 is a circuit diagram illustrating a configuration of a subpixel in a display apparatus according to the aspect of the present disclosure.

Referring to FIG. 2, in a display apparatus 100 according to the aspect of the present disclosure, a subpixel SP may include one or more transistors and a capacitor, and an organic light emitting diode OLED may be disposed as a light emitting element ED.

The subpixel SP may include a driving transistor DRT, a switching transistor SWT, a sensing transistor SENT, a storage capacitor Cst, and a light emitting element ED.

The driving transistor DRT may include a first node N1, a second node N2, and a third node N3. The first node N1 of the driving transistor DRT may be a gate node to which a data voltage Vdata is applied from a data driver 130 through a data line DL when the switching transistor SWT is turned-on. The second node N2 of the driving transistor DRT may be electrically connected to an anode electrode of the light emitting element ED and may be a source node or a drain node. The third node N3 of the driving transistor DRT may be electrically connected to a driving voltage line VL to which a driving voltage EVDD is applied, and may be a drain node or a source node.

During a display driving period, the driving voltage EVDD required to display an image may be supplied to the driving voltage line VL. For example, the driving voltage EVDD required to display an image may be 27V.

The switching transistor SWT is electrically connected between the data line DL and the first node N1 of the driving transistor DRT. A gate line GL is connected to the gate node, and the gate node may operate according to a scan signal supplied through the gate line GL. In addition, when the switching transistor SWT is turned-on, the data voltage Vdata supplied through the data line DL is transferred to the gate node of the driving transistor DRT, thereby controlling an operation of the driving transistor DRT.

The sensing transistor SENT is electrically connected between the second node N2 of the driving transistor DRT and a reference line RL. The gate line GL is connected to the gate node, and the gate node may operate according to a sense signal SENSE supplied through the gate line GL. When the sensing transistor SENT is turned-on, a reference voltage supplied through the reference line RL may be transferred to the second node N2 of the driving transistor DRT.

That is, the voltage in the first node N1 and the voltage in the second node N2 of the driving transistor DRT may be controlled by the switching transistor SWT and the sensing transistor SENT so that the current for driving the light emitting element ED may be supplied.

The gate node of the switching transistor SWT and the sensing transistor SENT may be connected to one gate line GL or may be connected to the different gate lines GL. In one aspect, the switching transistor SWT and the sensing transistor SENT are connected to the different gate lines GL. In this case, the switching transistor SWT and the sensing transistor SENT may be independently controlled by the scan signal SCAN and the sense signal SENSE transmitted through the different gate lines GL.

When the switching transistor SWT and the sensing transistor SENT are connected to one gate line GL, the switching transistor SWT and the sensing transistor SENT may be simultaneously controlled by the scan signal SCAN or the sense signal SENSE transmitted through one gate line GL, which creation additional space to increase an aperture ratio of the subpixel SP.

On the other hand, the transistor disposed in the subpixel SP may be formed of a P-type transistor as well as an N-type transistor. In one aspect, the transistor is composed of the N-type transistor is illustrated for exemplary purposes.

The storage capacitor Cst is electrically connected between the first node N1 and the second node N2 of the driving transistor DRT, and the storage capacitor Cst may maintain the data voltage Vdata during one frame.

The storage capacitor Cst may be connected between the first node N1 and the third node N3 of the driving transistor DRT according to the type of the driving transistor DRT. The anode electrode of the light emitting element ED may be electrically connected to the second node N2 of the driving transistor DRT, and a base voltage EVSS may be applied to a cathode electrode of the light emitting element ED.

For example, the base voltage EVSS may be a ground voltage or a voltage higher or lower than the ground voltage. In addition, the ground voltage EVSS may be varied according to the driving state. For example, the ground voltage EVSS during the display driving period and the ground voltage EVSS during the sensing period may be set to be different from each other.

The structure of the subpixel SP described in the above example above is a referred to as a 3T (transistor) 1C (capacitor) structure, which is merely an example for explanation. The subpixel SP may further include one or more transistors, or may further include one or more capacitors, if needed. Alternatively, each of the plurality of subpixels SP may have the same structure, and some of the plurality of subpixels SP may have the different structures.

The display apparatus 100 according to the aspect of the present disclosure may measure a current flowing by a voltage charged in the storage capacitor Cst during a sensing period of the driving transistor DRT to effectively sense a characteristic value of the driving transistor DRT, for example, a threshold voltage or a mobility.

That is, the change in the characteristic value or the characteristic value of the driving transistor DRT in the subpixel SP may be determined by measuring the current flowing by the voltage charged in the storage capacitor Cst in the sensing period of the driving transistor DRT.

During the sensing period, a reference line RL transfers a reference voltage VREF, and also serves as a sensing line for sensing a characteristic value of a driving transistor DRT in a subpixel SP The reference line RL may also be referred to as the sensing line.

Figure 3:
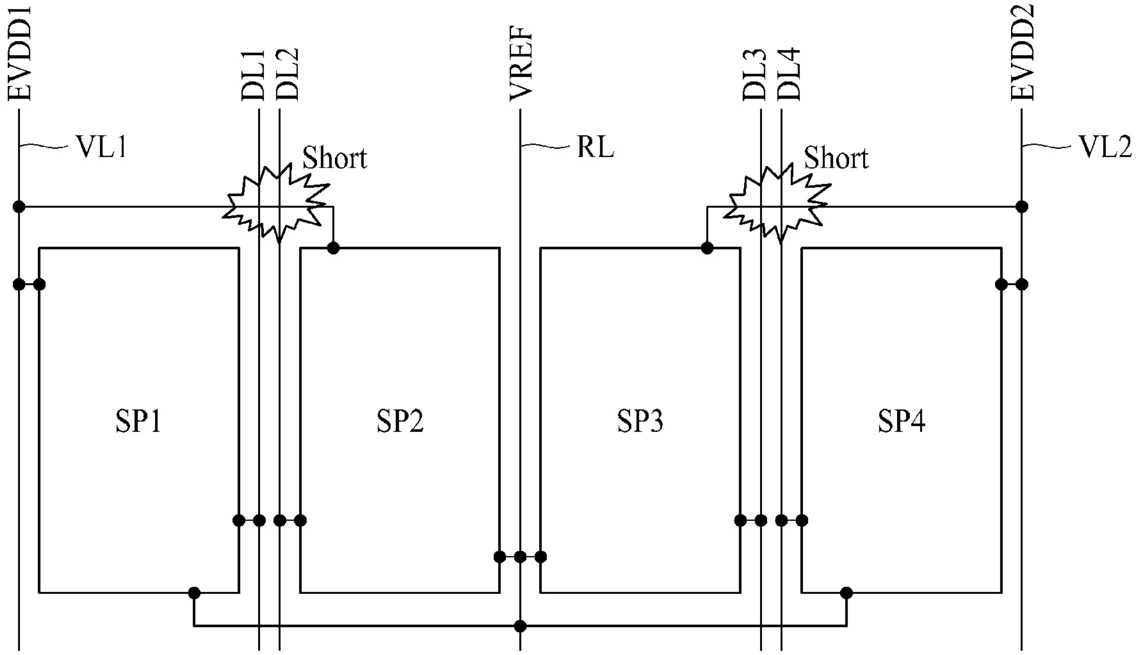
FIG. 3 is a diagram illustrating an arrangement of main signal lines in the display apparatus according to the aspect of the present disclosure.

FIG. 3 is a diagram illustrating an arrangement of main signal lines in the display apparatus according to the aspect of the present disclosure.

Referring to FIG. 3, a display panel 110 according to the aspect of the present disclosure may include data lines DL1, DL2, DL3, and DL4, driving voltage lines VL1 and VL2, and a reference line RL to drive each subpixel SP.

Each subpixel SP may be electrically connected to one data line DL, one driving voltage line VL, and one reference line RL. For example, one pixel may include four subpixels SP1, SP2, SP3, and SP4. The four subpixels SP1, SP2, SP3, and SP4 may include a first subpixel SP1 for emitting red light, a second subpixel SP2 for emitting white light, a third subpixel SP3 for emitting blue light, and a fourth subpixel SP4 for emitting green light.

The four subpixels SP1, SP2, SP3, and SP4 may be arranged in a horizontal direction (e.g., a row direction). The four data lines DL1, DL2, DL3, and DL4 for supplying a data voltage to each of the four subpixels SP1, SP2, SP3, and SP4 may be arranged in a vertical direction (e.g., a column direction). For example, the first subpixel SP1 may be connected to the first data line DL1, the second subpixel SP2 may be connected to the second data line DL2, the third subpixel SP3 may be connected to the third data line DL3, and the fourth subpixel SP4 may be connected to the fourth data line DL4. For example, the subpixels arranged in the same column as the first subpixel SP1 may share the first data line DL1, the subpixels arranged in the same column as the second subpixel SP2 may share the second data line DL2, the subpixels arranged in the same column as the third subpixel SP3 may share the third data line DL3, and the subpixels arranged in the same column as the fourth subpixel SP4 may share the fourth data line DL4.

The driving voltage lines VL1 and VL2 may be arranged one by one at every one or two or more columns of the subpixel. For example, the first driving voltage line VL1 may be located on the left side of the first subpixel SP1 and the second subpixel SP2 and may commonly supply the driving voltage EVDD to each of the first subpixel SP1 and the second subpixel SP2. The second driving voltage line VL2 may be located on the right side of the third subpixel SP3 and the fourth subpixel SP4 and may commonly supply the driving voltage EVDD to each of the third subpixel SP3 and the fourth subpixel SP4. For example, the subpixels arranged in the same column as the first subpixel SP1 and the subpixels arranged in the same column as the second subpixel SP2 may share the first driving voltage line VL1, and the subpixels arranged in the same column as the third subpixel SP3 and the subpixels arranged in the same column as the fourth subpixel SP4 may share the second driving voltage line VL2.

The reference line RL may be arranged one by one at every one or two or more columns of the subpixels. The reference line RL may be arranged between the two adjacent subpixels among the four subpixels SP1, SP2, SP3, and SP4. For example, the reference line RL may be arranged between the second subpixel SP2 and the third subpixel SP3 and may be connected to each of the four subpixels SP1, SP2, SP3, and SP4. The reference line RL may commonly supply a reference voltage VREF to each of the four subpixels SP1, SP2, SP3, and SP4. For example, the subpixels arranged in the same column as the first subpixel SP1, the subpixels arranged in the same column as the second subpixel SP2, the subpixels arranged in the same column as the third subpixel SP3, and the subpixels arranged in the same column as the fourth subpixel SP4 may share one reference line RL.

In an aspect shown in FIG. 3, a short circuit between the data lines DL or a short circuit between the data line DL and the driving voltage line VL may occur due to various causes, such as foreign matter, external temperature, impact, or damage caused by a panel repair on the manufacturing process of the display panel. For example, the first data line DL1 (or the third data line DL3) and the second data line DL2 (or the fourth data line DL4) are adjacent to each other, and a short circuit defect may occur between the first data line DL1 and the second data line DL2 (e.g., data line DL1 and data line DL2 are electrically connected to each other). Also, the first data line DL1 (or the fourth data line DL4) and the first driving voltage line VL1 (or the second driving voltage line VL2) are adjacent to each other, and a short circuit defect may occur in the first data line DL1 and the first driving voltage line VL1.

As described above, when a short circuit defect occurs between the lines, an abnormal current (or voltage) or an overcurrent (or overvoltage) may be applied to the display panel 110. In this case, it is difficult for the display panel 110 to be normally operated, and a screen abnormality such as a dark line or a bright line may occur. Particularly, in case of the bright line, may easily be recognized as abnormality by a user.

Disclosed is a data driving circuit capable of detecting defects generated in a signal line of a display panel by recognizing the short circuits in various electrical lines and performing a repairing process by darkening a bright line defect caused by the signal line with the defect, and a display apparatus having the same.

Hereinafter, a data driving circuit according to the present disclosure capable of detecting a defective signal line and repairing the defect and a display apparatus including the same will be described as follows.

Figure 4:
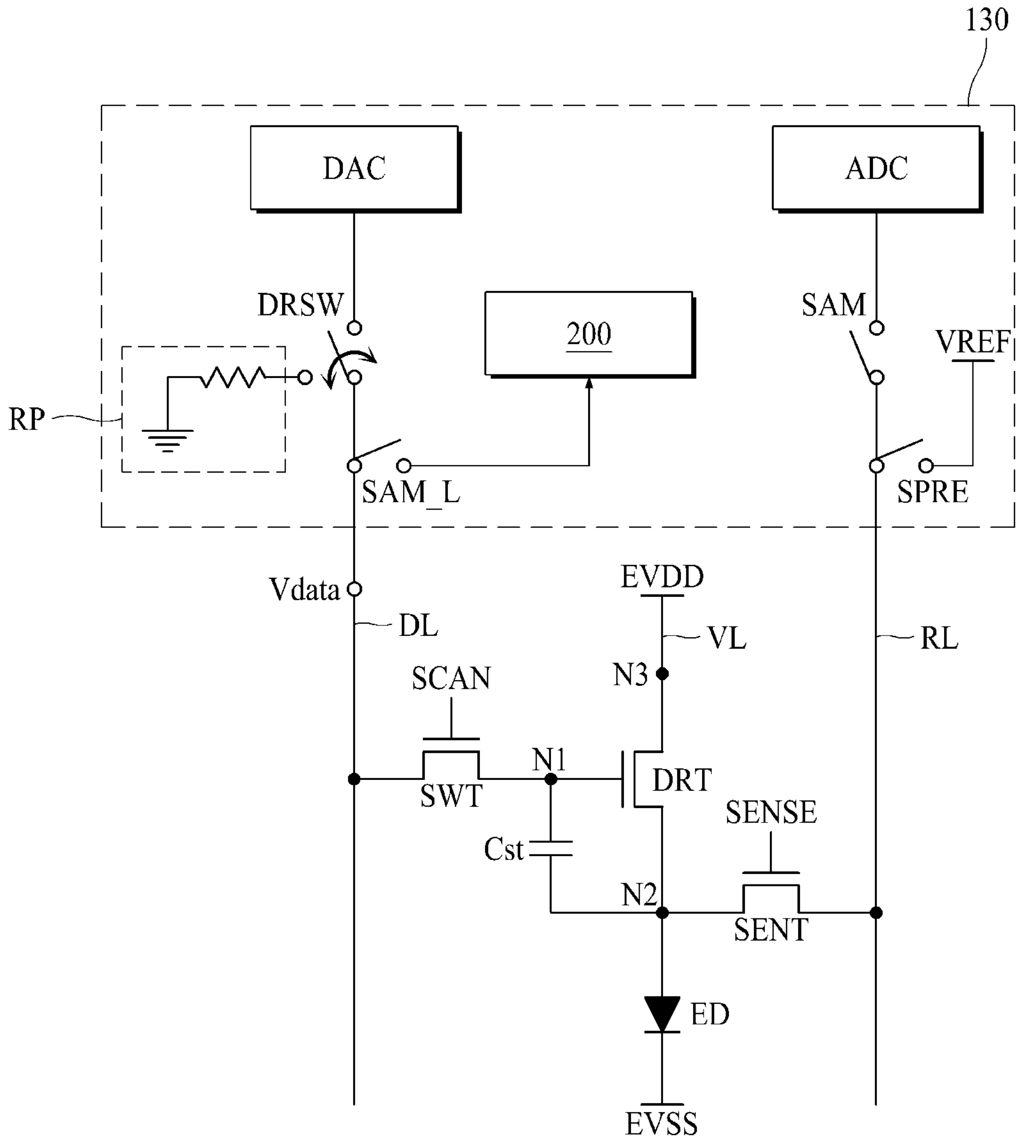
FIG. 4 is a diagram illustrating a part of a data driver in the display apparatus according to the aspect of the present disclosure.

FIG. 4 shows a part of a data driving portion in the display apparatus according to the aspect of the present disclosure.

Referring to FIG. 4, a data driver 130 according to the aspect of the present disclosure may perform a pixel compensation function for compensating for the change or deviation of the driving characteristic of the subpixels SP. For example, the driving characteristic of the subpixel SP may include threshold voltage or mobility of the driving transistor DRT.

The data driver 130 is connected to a first node N1 of the subpixel SP through the data line DL and is configured to supply a data voltage Vdata converted in the form of an analog signal through a digital-to-analog converter DAC to the data line DL. A switching transistor SWT of the subpixel SP is disposed between the data line DL and the first node N1 and is turned-on by a scan signal supplied from a gate line GL to supply the data voltage Vdata to the first node N1 (e.g., a gate node of the driving transistor DRT).

The data driver 130 is connected to a second node N2 of the subpixel SP through the reference line RL and is configured to supply the reference voltage VREF to the reference line RL through an initialization switch SPRE. For example, a voltage value may vary according to the type of driving mode. Also, the data driver 130 may supply a sensing voltage of the reference line RL that is connected to an analog-to-digital converter ADC senses a voltage applied to the reference line RL and converting the sensed voltage into a digital signal form through a sampling switch SAM. A sensing transistor SENT of the subpixel SP is disposed between the reference line RL and the second node N2 and is turned on by a sense signal SENSE supplied from the gate line GL, to thereby transmit the reference voltage VREF supplied through the reference line RL to the second node N2 of the driving transistor DRT.

The data driver 130 according to the aspect of the present disclosure may detect whether the signal line (for example, the data line, the reference line, the driving voltage line, etc.) arranged in the subpixel SP is defective, and may perform a line compensation function for repairing the defective signal line. For example, the defect of the signal line may be the short circuit defect between the data line DL and another data line DL adjacent to the data line DL, or the short circuit defect between the data line DL and the adjacent driving voltage line VL. Also, the data driver 130 may repair the data line DL having the short circuit defect.

The data driver 130 according to the aspect of the present disclosure may further include a line defect detecting portion 200 (or a line defect detector) and a line repairing portion RP (or a line correction circuit) to perform the line compensation function.

The line defect detecting portion 200 (or the line defect detector) may be connected to the data line DL through a line sampling switch SAM_L. The line defect detecting portion 200 may be connected to another data line DL of the adjacent subpixel. For example, the line defect detecting portion 200 may be connected to the data lines DL adjacent to each other among the plurality of data lines DL. For example, the line defect detecting portion 200 may be connected to the first data line DL1 and the second data line DL2 among the plurality of data lines DL. Alternatively, the line defect detecting portion 200 may be connected to the third data line DL3 and the fourth data line DL4 among the plurality of data lines DL.

The line defect detecting portion 200 is connected to the adjacent data lines DL through the line sampling switch SAM_L, senses the sensing data voltage of each of the adjacent data lines DL, and detects whether the short circuit occurs between the adjacent data lines DL based on the sensing data voltage.

The line defect detecting portion 200 may perform the sensing operation of the adjacent data lines DL in conjunction with the digital-to-analog converter DAC. For example, the digital-to-analog converter DAC supplies the sensing data voltage having different voltage levels to the adjacent data lines DL, and the line defect detecting portion 200 may sense the sensing data voltage from the data lines DL to which the sensing driving data voltage is supplied.

The line defect detecting portion 200 may detect whether adjacent data lines DL are shorted and defective based on the sensing data voltage of each of the adjacent data lines DL. For example, the line defect detecting portion 200 may detect whether the adjacent data lines DL are shorted by comparing the sensing data voltages of the adjacent data lines DL with each other.

The line repairing portion RP may be disposed between the digital-to-analog converter DAC and the data line DL. The line repairing portion RP is connected to the data line DL in which the short circuit defect is generated, so that the short circuit defect may be repaired by darkening the corresponding data line DL. The line repairing portion RP may be connected to the data line DL in which the short circuit defect is generated through a repair switch DRSW which selectively connects the digital-to-analog converter DAC to the data line DL. For example, when the data line DL is in a normal state, the repair switch DRSW may electrically connect the digital-to-analog converter DAC to the corresponding data line DL.

When the short circuit defect is generated in the data line DL, the repair switch DRSW may block the electrical connection between the digital-to-analog converter DAC and the data line DL and may connect the corresponding data line DL to the line repairing portion RP. Accordingly, the data voltage is not supplied to the data line DL when connected to the line repairing portion RP, and the subpixels connected to the corresponding data line DL are darkened, thereby repairing a bright line defect having strong visibility by a user.

Figure 5:
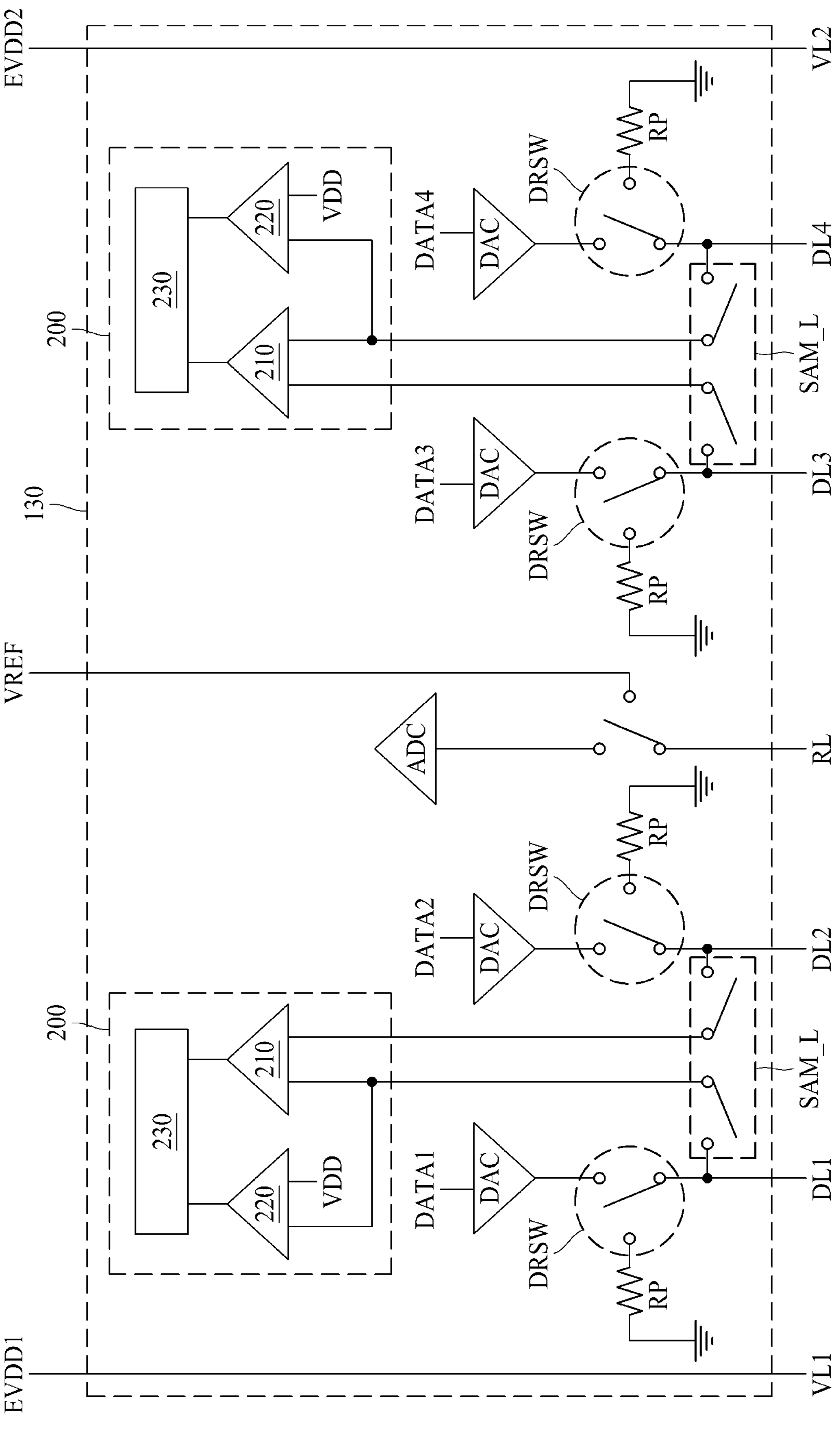
FIG. 5 is a diagram illustrating a configuration of a data driver for detecting a line defect in the display apparatus according to the aspect of the present disclosure.
Figure 6:
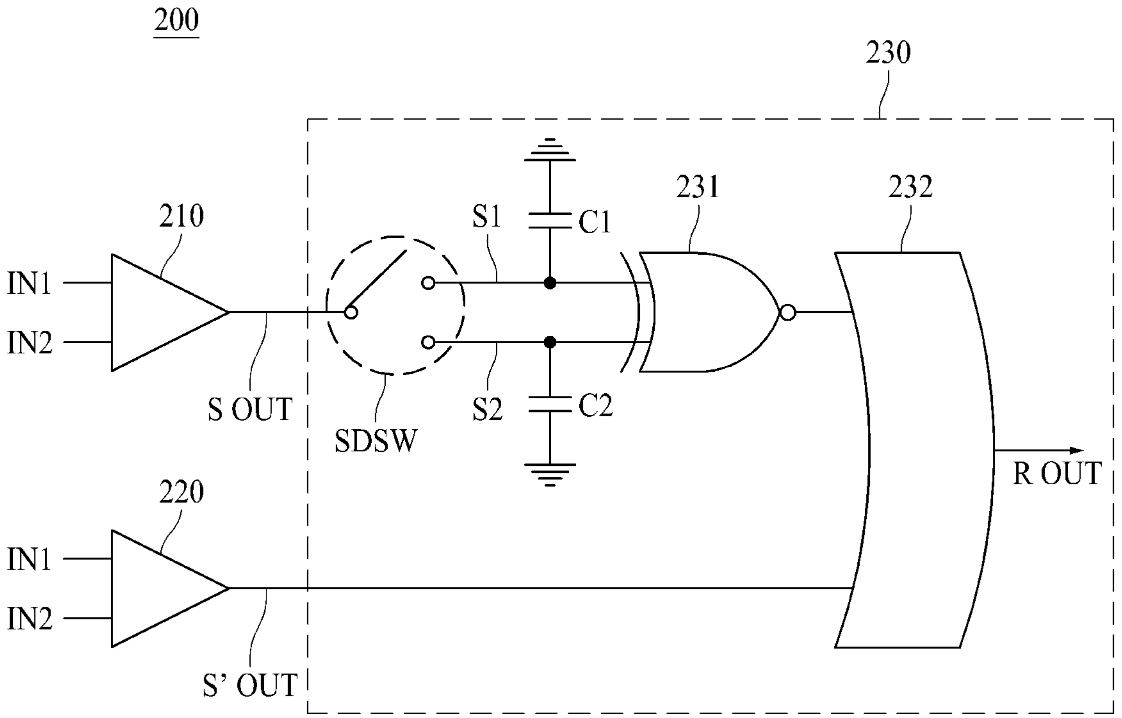
FIG. 6 is a diagram illustrating a configuration of a line defect detecting portion in the display device according to the aspect of the present disclosure.

FIG. 5 shows a configuration of the data driving portion for detecting the line defect in the display apparatus according to the aspect of the present disclosure. FIG. 6 is a diagram illustrating a configuration of the line defect detecting portion in the display apparatus according to the aspect of the present disclosure.

Referring to FIGS. 5 and 6, the data driver 130 according to the aspect of the present disclosure is configured to perform the line compensation function and includes the digital-to-analog converter DAC, the line defect detecting portion 200, the line repairing portion RP, the line sampling switch SAM_L, and the repair switch DRSW.

The digital-to-analog converter DAC may be connected to each of the first data line DL1, the second data line DL2, the third data line DL3, and the fourth data line DL4, which are connected to each of the plurality of subpixels SP1, SP2, SP3, and SP4. The digital-to-analog converter DAC may supply the sensing driving data voltages having the different voltage levels to the respective first data line DL1 and second data line DL2 adjacent to each other among the plurality of data lines DL1, DL2, DL3, and DL4. The digital-to-analog converter DAC may supply the sensing driving data voltage to each of the third data line DL3 and the fourth data line DL4 adjacent to each other among the plurality of data lines DL1, DL2, DL3, and DL4.

The repair switch DRSW may be disposed between the digital-to-analog converter DAC and each of the plurality of data lines DL1, DL2, DL3, and DL4.

When the plurality of data lines DL1, DL2, DL3, and DL4 are in the normal state, the repair switch DRSW may electrically connect the digital-to-analog converter DAC and the plurality of data lines DL1, DL2, DL3, and DL4.

When the short circuit defect occurs in the plurality of data lines DL1, DL2, DL3, and DL4, the repair switch DRSW may block the electrical connection between the digital-to-analog converter DAC and the data lines DL having the short circuit defect. Also, when the bright line defect occurs due to the short circuit defect, the repair switch DRSW may connect the corresponding data line DL to the line repairing portion RP. Accordingly, it is possible to repair the bright line defect having a strong user visibility by darkening the corresponding data line DL.

The line defect detecting portion 200 is connected to the adjacent first data line DL1 and second data line DL2 by controlling the line sampling switch SAM_L, and is configured to sense the sensing data voltage of each of the first data line DL1 and the second data line DL2 and detect whether the short circuit occurs between the first data line DL1 and the second data line DL2 based on the sensing data voltage. Also, the line defect detecting portion 200 is connected to the adjacent third data line DL3 and fourth data line DL4 by controlling the line sampling switch SAM_L, and is configured to sense the sensing data voltage of each of the third data line DL3 and the fourth data line DL4 and detect whether the short circuit occurs between the third data line DL3 and the fourth data line DL4 based on the sensing data voltage. Also, the line defect detecting portion 200 is connected to the first data line DL1 and reference driving voltage VDD by controlling the line sampling switch SAM_L and is configured to detect whether a short circuit between the first data line DL1 and the first driving voltage line VL1 (e.g., a defect) based on the sensing data voltage of the first data line DL1 and the reference driving voltage VDD. Also, the line defect detecting portion 200 is connected to the fourth data line DL4 and reference driving voltage VDD by controlling the line sampling switch SAM_L and to detect whether a short circuit between the fourth data line DL4 and the second driving voltage line VL2 based on the sensing data voltage of the fourth data line DL4 and the reference driving voltage VDD.

The line defect detecting portion 200 may include a first line voltage sensing block 210 (or a first line voltage sensor), a second line voltage sensing block 220 (or a second line voltage sensor), and a line defect determining block 230 (or a short circuit detector).

The first line voltage sensing block 210 is connected to the first data line DL1 (or third data line DL3) and the second data line DL2 (or fourth data line DL4) and is configured to sense the sensing data voltage of each of the first data line DL1 and the second data line DL2 and generate a line detection data signal. The first line voltage sensing block 210 may transmit the generated line detection data signal to the line defect determining block 230.

The first line voltage sensing block 210 senses the sensing data voltage of each of the first data line DL1 and the second data line DL2 and generates the line detection data signal based on each sensing data voltage. For example, the first line voltage sensing block 210 may generate the line detection data signal by comparing the sensing data voltage of the first data line DL1 and the sensing data voltage of the second data line DL2. In one aspect, the first line voltage sensing block 210 may include at least one of a comparison amplifier (or a comparator) and an analog-to-digital converter.

The second line voltage sensing block 220 may be connected to the first data line DL1 (or fourth data line DL4) and the reference driving voltage VDD and may be configured to generate the line detection data signal by comparing the sensing data voltage of the first data line DL1 with the reference driving voltage VDD. The reference driving voltage VDD may be lower than the driving voltage EVDD. For example, the reference driving voltage VDD may be higher than the sensing data voltage of the first data line DL1 and may be lower than the driving voltage EVDD. In some aspects, any one of a plurality of gamma signal voltages may be used as the reference driving voltage VDD.

Presuming that the first data line DL1 and the first driving voltage line VL1 are in the normal state, the line detection data signal of the second line voltage sensing block 220 may have a signal value of a low voltage level since the sensing data voltage of the first data line DL1 has a lower voltage than the reference driving voltage VDD. Also, presuming that the short circuit occurs between the first data line DL1 and the first driving voltage line VL1, the line detection data signal of the second line voltage sensing block 220 may have a signal value of a high voltage level since the driving voltage EVDD of the first driving voltage line VL1 may be applied to the first data line DL1 and the sensing data voltage of the first data line DL1 has a higher voltage than the reference driving voltage VDD. For example, when the line detection data signal corresponds to the low voltage level, the first data line DL1 and the first driving voltage line VL1 are in the normal state. When the line detection data signal is corresponds to the high voltage level, the first data line DL1 and the first driving voltage line VL1 are shorted (e.g., defective).

According to another aspect of the present disclosure, the second line voltage sensing block 220 may be connected to the second data line DL2 (or third data line DL3) and the reference driving voltage VDD. In this case, the second line voltage sensing block 220 may output a result value according to a short circuit between the second data line DL2 and the first driving voltage line VL1 or between the third data line DL3 and the second driving voltage line VL2.

The line defect detecting portion 200 may perform the sensing operation of the first data line DL1 and the second data line DL2 in conjunction with the digital-to-analog converter DAC. For example, the first line voltage sensing block 210 may perform the sensing operation of the first data line DL1 and the second data line DL2 in conjunction with the digital-to-analog converter DAC.

The sensing driving data voltage that is supplied to each of the first data line DL1 and the second data line DL2 from the digital-to-analog converter DAC may include a first sensing driving data voltage having a first voltage level (or high voltage level) and a second sensing driving data voltage having a second voltage level (or low voltage level).

The sensing operation of the first data line DL1 and the second data line DL2 performed by operation of the line defect detecting portion 200 with the digital-to-analog converter DAC may include a first sensing operation and a second sensing operation.

In the first sensing operation, the digital-to-analog converter DAC supplies the first sensing driving data voltage to the first data line DL1 and the second sensing driving data voltage to the second data line DL2. In the second sensing operation, the digital-to-analog converter DAC may supply the second sensing driving data voltage to the first data line DL1 and may supply the first sensing driving data voltage to the second data line DL2.

The line defect detecting portion 200 may detect whether the short circuit occurs between the first data line DL1 and the second data line DL2 based on the sensing data voltage sensed in the first sensing operation and the sensing data voltage sensed in the second sensing operation. For example, in the first sensing operation, the first line voltage sensing block 210 may generate and output a first line detection data signal based on the sensing data voltage of each of the first data line DL1 and the second data line DL2. Also, in the second sensing operation, the first line voltage sensing block 210 may generate and output a second line detection data signal based on the sensing data voltage of each of the first data line DL1 and the second data line DL2. The line defect determining block 230 may then determine whether the short circuit exists between the first data line DL1 and the second data line DL2 based on the first line detection data signal and the second line detection data signal. For example, the line defect determining block 230 may determine the first data line DL1 and the second data line DL2 are shorted by comparing the first line detection data signal and the second line detection data signal with each other. For example, if the first line detection data signal and the second line detection data signal are the same signal, the line defect determining block 230 may determine that the first data line DL1 and the second data line DL2 are shorted.

Referring to FIG. 6, the line defect detecting portion 200 may include the first line voltage sensing block 210, the second line voltage sensing block 220, and the line defect determining block 230. The line defect determining block 230 may include a signal distribution switch SDSW, a first buffer capacitor C1, a second buffer capacitor C2, a first logic circuit 231, and a second logic circuit 232.

In the first line voltage sensing block 210, the sensing data voltage of the first data line DL1 may be applied to a first input terminal IN1, and the sensing data voltage of the second data line DL2 may be applied to a second input terminal IN2. The first line voltage sensing block 210 may output the line detection data signal through an output terminal S OUT as a result value obtained by comparing the sensing data voltage applied to the first input terminal IN1 and the sensing data voltage applied to the second input terminal IN2.

In the first sensing operation, the first line voltage sensing block 210 may output the first line detection data signal by comparing the sensing data voltage of the first data line DL1 supplied with the first sensing driving data voltage (e.g., the high voltage level) and the sensing data voltage of the second data line DL2 supplied with the second sensing driving data voltage (e.g., the low voltage level). For example, when the first data line DL1 and the second data line DL2 are in the normal state, the first line detection data signal outputted in the first sensing operation may be outputted as the first line detection data signal having the high voltage level.

In the second sensing operation, the first line voltage sensing block 210 may output the second line detection data signal by comparing the sensing data voltage of the first data line DL1 supplied with the second sensing driving data voltage (e.g., the low voltage level) and the sensing data voltage of the second data line DL2 supplied with the first sensing driving data voltage (e.g., the high voltage level). For example, when the first data line DL1 and the second data line DL2 are in the normal state, the second line detection data signal outputted in the second sensing operation may be output as the second line detection data signal having the low voltage level.

The signal distribution switch SDSW supplies the first line detection data signal output from the first line voltage sensing block 210 to the first signal line S1 in the first sensing operation and supplies the second line detection data signal output from the first line voltage sensing block 210 to the second signal line S2 in the second sensing operation. Each of the first signal line S1 and the second signal line S2 may include the first buffer capacitor C1 and the second buffer capacitor C2. Each of the first signal line S1 and the second signal line S2 may store the first line detection data signal and the second line detection data signal using the first buffer capacitor C1 and the second buffer capacitor C2, and may supply the above signals to a first logic circuit 231 at the same time.

The first logic circuit 231 may compare the first line detection data signal and the second line detection data signal and transfer the result of the comparison to a second logic circuit 232. For example, the first logic circuit 231 may be composed of an XOR gate. When the first line detection data signal and the second line detection data signal are the same signal, the first logic circuit 231 may output a result value through the XOR gate indicating that the first data line DL1 and the second data line DL2 are shorted (e.g., electrically connected with a low impedance path).

The sensing data voltage of the first data line DL1 (or fourth data line DL4) is applied to the first input terminal IN1 of the second line voltage sensing block 220, and the reference driving voltage VDD may be applied to the second input terminal IN2. The second line voltage sensing block 220 may output the line detection data signal compare the sensing data voltage applied to the first input terminal IN1 and the reference driving voltage VDD applied to the second input terminal IN2 and generate a result of the comparison on the output terminal S'OUT.

When the first data line DL1 and the first driving voltage line VL1 are in the normal state, the sensing data voltage of the first data line DL1 has a lower voltage than the reference driving voltage VDD. In this case, the line detection data signal of the second line voltage sensing block 220 may have a signal value of a low voltage level. Also, when the short circuit occurs between the first data line DL1 and the first driving voltage line VL1, the driving voltage EVDD of the first driving voltage line VL1 may be applied to the first data line DL1 and the sensing data voltage of the first data line DL1 may have a higher voltage than the reference driving voltage VDD. As a result, the line detection data signal of the second line voltage sensing block 220 has a signal value of a high voltage level. For example, when the line detection data signal is the signal value of the low voltage level, the first data line DL1 and the first driving voltage line VL1 are in the normal state. Also, when the line detection data signal is the signal value of the high voltage level, the first data line DL1 and the first driving voltage line VL1 are shorted.

The second logic circuit 232 may be connected to the first logic circuit 231 and the second line voltage sensing block 220. The second logic circuit 232 may determine the presence of a short circuit (e.g., a defect) between the data lines DL, the presence of a short circuit between the data line DL and the drive voltage line VL based on the result value of the first logic circuit 231 and the output value of the second line voltage sensing block 220. In some aspects, the second logic circuit 232 may be composed of an OR gate or other similar circuitry. For example, when at least one of the short circuit between the data lines DL and the short circuit defect between the data line DL and the driving voltage line VL is detected, the second logic circuit 232 may output a result value indicating a defective line through the OR gate.

A data driving circuit and a display apparatus comprising the same according to various aspects of the present disclosure will be described below.

A data driving circuit according to various aspects of the present disclosure may include a digital-to-analog converter configured to supply a data voltage to a plurality of data lines connected to respective pixels, and supply sensing driving data voltages having different voltage levels to a first data line and a second data line adjacent to each other among the plurality of data lines, and a line defect detector connected to the first data line and the second data line and configured to sense a sensing data voltage of each of the first data line and the second data line, and detect the presence of a short circuit between the first data line and the second data line based on the sensing data voltage.

According to various aspects of the present disclosure, the line defect detector may include a line voltage sensor connected to the first data line and the second data line and configured to sense a voltage of each of the first data line and the second data line and generate a line detection signal, and a short circuit detector configured to determine whether the short circuit between the first data line and the second data line exists based on the line detection signal.

According to various aspects of the present disclosure, the line voltage sensor may sense the sensing data voltage of each of the first data line and the second data line and may generate the line detection signal based on sensed voltages.

According to various aspects of the present disclosure, the line voltage sensor may compare each sensed voltage of the first data line with each sensed voltage of the second data line.

According to various aspects of the present disclosure, the line voltage sensor may include at least one of a comparator and an analog-to-digital converter.

According to various aspects of the present disclosure, the line defect detector and the digital-to-analog converter may be configured to perform a sensing operation on the first data line and the second data line.

According to various aspects of the present disclosure, the line defect detector may be configured to sense a first signal having a first voltage level and a second signal having a second voltage level different from the first voltage level.

According to various aspects of the present disclosure, the sensing operation may include a first sensing operation and a second sensing operation.

According to various aspects of the present disclosure, in the first sensing operation, the digital-to-analog converter may supply the first signal to the first data line and the second signal to the second data line, and in the second sensing operation, the digital-to-analog converter may supply the second signal to the first data line and the first signal to the second data line.

According to various aspects of the present disclosure, the line defect detector may detect presence of the short circuit between the first data line and the second data line based on a first sensed voltage in the first sensing operation and a second sensed voltage in the second sensing operation.

According to various aspects of the present disclosure, in the first sensing operation, the line voltage sensor may generate and output a first line detection signal based on the at least one sensed voltage of each of the first data line and the second data line, and in the second sensing operation, the line voltage sensor may generate and output a second line detection signal based on the sensed voltage of each of the first data line and the second data line.

According to various aspects of the present disclosure, the short circuit detector may determine presence of the short circuit between the first data line and the second data line based on the first line detection signal and the second line detection signal.

According to various aspects of the present disclosure, the short circuit detector may determine presence of the short circuit between the first data line and the second data line by comparing the first line detection signal with the second line detection signal.

According to various aspects of the present disclosure, the short circuit detector may determine that the first data line and the second data line are shorted when the first line detection signal and the second line detection signal are the same signal.

According to various aspects of the present disclosure, the short circuit detector may include at least one buffer capacitor and at least one logic circuit.

According to various aspects of the present disclosure, the at least one logic circuit may include at least one of XOR gate and OR gate.

According to various aspects of the present disclosure, may further include a line correction circuit provided between the digital-to-analog converter and the plurality of data lines and configured to block a connection between the digital-to-analog converter and the first data line and the second data line based on presence of the short circuit.

According to various aspects of the present disclosure, may further include a driving voltage line adjacent to the first data line, the line defect detector may be connected to the first data line and a reference driving voltage and may be configured to detect presence of the short circuit between the driving voltage line and the first data line based on sensed voltages of the first data line and the reference driving voltage.

According to various aspects of the present disclosure, the line defect detector may determine presence of the short circuit between the driving voltage line and the first data line by comparing the sensing data voltage of the first data line with the reference driving voltage.

A display apparatus according to various aspects of the present disclosure may include a display panel on which a plurality of pixels connected to a plurality of data lines are disposed, and a data driver including a digital-to-analog converter and a line defect detector and configured to drive the plurality of data lines based on detected defects associated with the lines. The digital-to-analog converter and the line defect detector may be configured to supply a data voltage to a plurality of data lines connected to respective pixels, supply sensing driving data voltages having different voltage levels to a first data line and a second data line adjacent to each other among the plurality of data lines, sense a sensing data voltage of each of the first data line and the second data line, and detect the presence of a short circuit between the first data line and the second data line based on the sensing data voltage.

According to various aspects of the present disclosure, may further include a line correction circuit provided between the digital-to-analog converter and the plurality of data lines and configured to draw current to reduce brightness of a plurality of pixels based on the short circuit.

It will be apparent to those skilled in the art that various modifications and variations may be made in the present disclosure without departing from the scope of the disclosures. Thus, it is intended that the present disclosure covers the modifications and variations of this disclosure provided they come within the scope of the appended claims and their equivalents.

What is claimed is:

1. A data driving circuit comprising:

a digital-to-analog converter configured to:

supply a data voltage to a plurality of data lines connected to respective pixels, and supply sensing driving data voltages having different voltage levels to a first data line and a second data line adjacent to each other among the plurality of data lines; and a line defect detector connected to the first data line and the second data line and configured to:

sense a sensing data voltage of each of the first data line and the second data line, and detect the presence of a short circuit between the first data line and the second data line based on the sensing data voltage, wherein the line defect detector includes:

a line voltage sensor connected to the first data line and the second data line and configured to sense a voltage of each of the first data line and the second data line and generate a line detection signal; and a short circuit detector configured to determine whether the short circuit between the first data line and the second data line exists based on the line detection signal, wherein the line defect detector and the digital-to-analog converter are configured to perform a sensing operation on the first data line and the second data line, wherein the line defect detector is configured to sense a first signal having a first voltage level and a second signal having a second voltage level different from the first voltage level, wherein the sensing operation includes a first sensing operation and a second sensing operation, wherein the line defect detector detects presence of the short circuit between the first data line and the second data line based on a first sensed voltage in the first sensing operation and a second sensed voltage in the second sensing operation, wherein, in the first sensing operation, the line voltage sensor generates and outputs a first line detection signal based on the at least one sensed voltage of each of the first data line and the second data line, and wherein, in the second sensing operation, the line voltage sensor generates and outputs a second line detection signal based on the sensed voltage of each of the first data line and the second data line.

2. The data driving circuit of claim 1, wherein the line voltage sensor senses the sensing data voltage of each of the first data line and the second data line and generates the line detection signal based on sensed voltages.

3. The data driving circuit of claim 2, wherein the line voltage sensor compares each sensed voltage of the first data line with each sensed voltage of the second data line.

4. The data driving circuit of claim 1, wherein the line voltage sensor includes at least one of a comparator and an analog-to-digital converter.

5. The data driving circuit of claim 1, wherein, in the first sensing operation, the digital-to-analog converter supplies the first signal to the first data line and the second signal to the second data line, and wherein, in the second sensing operation, the digital-to-analog converter supplies the second signal to the first data line and the first signal to the second data line.

6. The data driving circuit of claim 1, wherein the short circuit detector determines presence of the short circuit between the first data line and the second data line based on the first line detection signal and the second line detection signal.

7. The data driving circuit of claim 6, wherein the short circuit detector determines presence of the short circuit between the first data line and the second data line by comparing the first line detection signal with the second line detection signal.

8. The data driving circuit of claim 7, wherein the short circuit detector determines that the first data line and the second data line are shorted when the first line detection signal and the second line detection signal are the same signal.

9. The data driving circuit of claim 1, wherein the short circuit detector includes at least one buffer capacitor and at least one logic circuit.

10. The data driving circuit of claim 9, wherein the at least one logic circuit includes at least one of XOR gate and OR gate.

11. The data driving circuit of claim 1, further comprising a line correction circuit provided between the digital-to-analog converter and the plurality of data lines and configured to block a connection between the digital-to-analog converter and the first data line and the second data line based on presence of the short circuit.

12. The data driving circuit of claim 1, further comprising a driving voltage line adjacent to the first data line, wherein the line defect detector is connected to the first data line and a reference driving voltage and is configured to detect presence of the short circuit between the driving voltage line and the first data line based on sensed voltages of the first data line and the reference driving voltage.

13. The data driving circuit of claim 12, wherein the line defect detector determines presence of the short circuit between the driving voltage line and the first data line by comparing the sensing data voltage of the first data line with the reference driving voltage.

14. A display apparatus comprising:

a display panel on which a plurality of pixels connected to a plurality of data lines are disposed; and a data driver including a digital-to-analog converter and a line defect detector and configured to drive the plurality of data lines based on detected defects associated with the lines, wherein the digital-to-analog converter and the line defect detector are configured to:

supply a data voltage to a plurality of data lines connected to respective pixels;

supply sensing driving data voltages having different voltage levels to a first data line and a second data line adjacent to each other among the plurality of data lines;

sense a sensing data voltage of each of the first data line and the second data line; and detect the presence of a short circuit between the first data line and the second data line based on the sensing data voltage, wherein the line defect detector includes:

a line voltage sensor connected to the first data line and the second data line and configured to sense a voltage of each of the first data line and the second data line and generate a line detection signal; and a short circuit detector configured to determine whether the short circuit between the first data line and the second data line exists based on the line detection signal, wherein the line defect detector and the digital-to-analog converter are configured to perform a sensing operation on the first data line and the second data line, wherein the line defect detector is configured to sense a first signal having a first voltage level and a second signal having a second voltage level different from the first voltage level, wherein the sensing operation includes a first sensing operation and a second sensing operation, wherein the line defect detector detects presence of the short circuit between the first data line and the second data line based on a first sensed voltage in the first sensing operation and a second sensed voltage in the second sensing operation, wherein, in the first sensing operation, the line voltage sensor generates and outputs a first line detection signal based on the at least one sensed voltage of each of the first data line and the second data line, and wherein, in the second sensing operation, the line voltage sensor generates and outputs a second line detection signal based on the sensed voltage of each of the first data line and the second data line.

15. The display apparatus of claim 14, further comprising a line correction circuit provided between the digital-to-analog converter and the plurality of data lines and configured to draw current to reduce brightness of a plurality of pixels based on the short circuit.

* * * * *